United States Patent Office 2,767,140
Patented Oct. 16, 1956

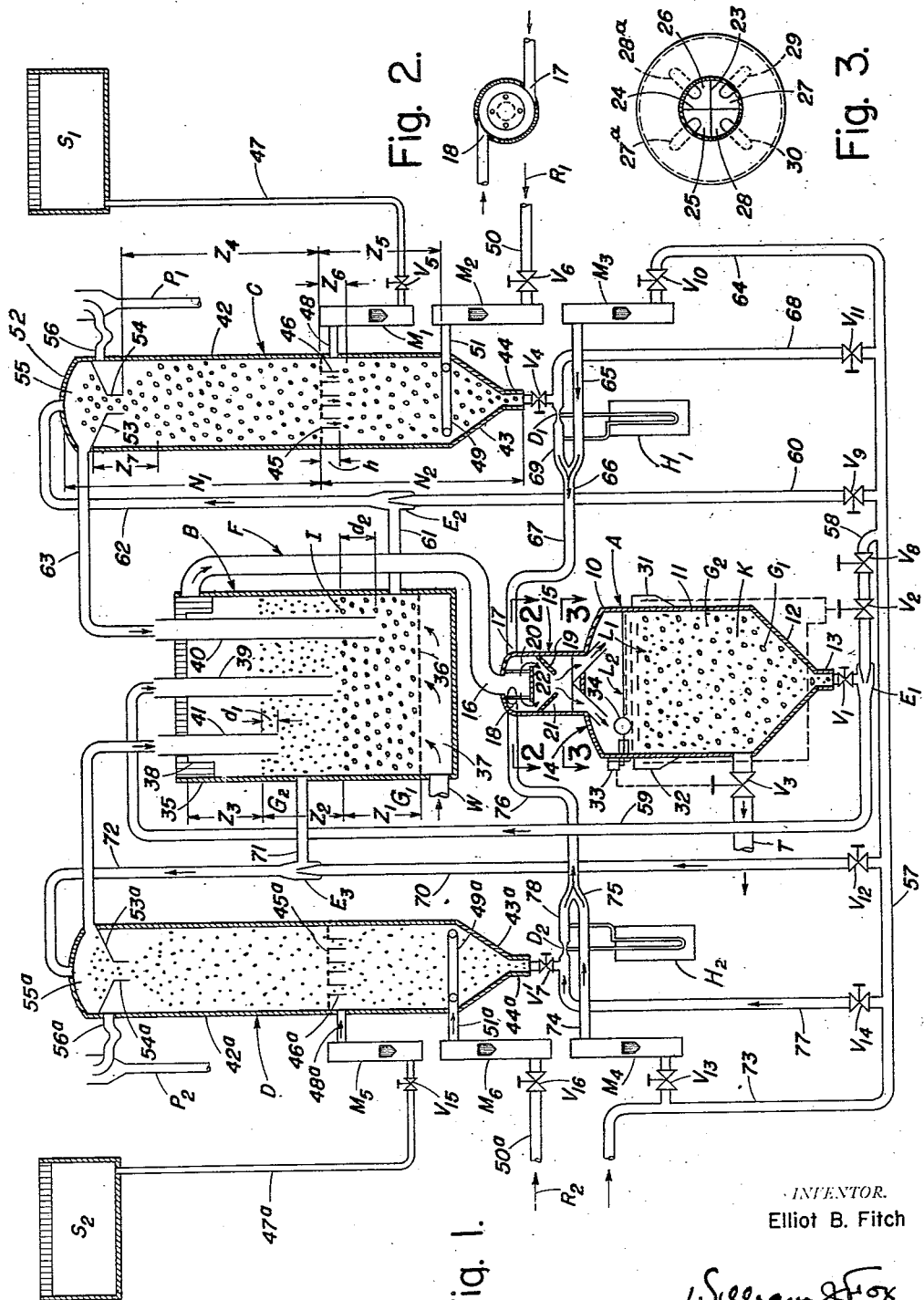

2,767,140

CONTINUOUS ION EXCHANGE TREATMENT

Elliot B. Fitch, Westport, Conn., assignor to Dorr-Oliver Incorporated, a corporation of Delaware Application October 7, 1954, Serial No. 460,851

2 Claims. (Cl. 210—24)

This invention relates to the ion exchange treatment of solutions by contact with a combination of cation exchange and anion exchange materials, in a manner whereby solutes are removable from the liquid, be it for the purpose of purifying the liquid by the removal of the solutes therefrom, or be it for the purpose of recovering the solutes as valuables from the liquid.

Both cation and anion exchange materials herein briefly termed ion exchangers may be in the nature of the well known family of exchange resins or so-called organolites, and in the operation of such a process the cation exchanger is activated or regenerated with a suitable acid (such as $H_2SO_4$) of suitable concentration so that the exchanger will acquire H-ions to be available for exchange against other cations, while the anion exchanger is activated or regenerated with a suitable alkali solution (such as sodium hydroxide NaOH), whereby this material will acquire OH-ions to be available for exchange against other anions.

Then, if, for example, a salt solution is to have its solute or salt removed therefrom, the cation exchanger will substitute H-ions for the cations of the salt, while the anion exchanger will substitute OH-ions for the anion of the salt. As a net result this ion exchange operation replaces the solute or salt with the molar equivalent of pure water $H_2O$, while the respective exchangers become exhausted with the respective cations and ions of the salt and must then be regenerated with their respective regenerant solutions.

Many kinds of solutions are thus purifiable by way of ion exchange treatment, and conversely, many kinds of salts or valuables are recoverable from impure solutions, in that they are found in the spent regenerant solutions. For example, a salt solution NaCl can have its salt removed by the molar substitution of $H_2O$ when the Na ions are exchanged for H-ions while the Cl ions are exchanged for OH-ions.

Sugar-bearing juices or solutions can have their ionizable impurities removed so that there results a sugar solution of increased purity, whereby the yield and purity of sugar crystallizable from the juice is increased. In another instance, copper or zinc in dilute solution as in mine waters may be adsorbed and recovered.

More specifically, this relates to improvements in an ion treatment method and system whereby the solution to be purified by ion exchange is contacted with a mixture of both cation and anion exchange materials in a continuous ion exchange operation. In such a continuous treatment system, a continuous flow of the raw solution is contacted with the mixed granular exchangers while both the solution and the material are in transit through an ion exchange station or tank. The treated solution and the mixed exchange materials issue from different points of the tank, whereupon the cation exchange material and the anion exchange material are segregated from one another in order that each exchange material might then be subjected to its own respective regeneration treatment and the regenerated materials then be remixed for recirculation to and through the ion exchange treatment station to serve in the continuous treatment of the raw solution being continuously supplied.

It is among the objects of this invention to provide a continuous ion exchange treatment system employing mixed exchange materials, which is simple, easy to control and to operate, highly efficient with respect to the removal of solutes from the solution being treated, or with respect to the recovery of valuable solutes, as well as highly efficient with respect to the utilization of the exchange capacity of the exchange materials so that thereby only a minimum of inventory of exchange material need be kept in circulation within the treatment system.

These objects are attained by providing an exchange treatment station or tank at the top of which enter a continuous feed supply of mixed granular cation and anion exchange materials as well as of the raw solution to be treated, so that both the solution as well as the mixed exchange materials may pass downwardly in the tank codirectionally. In this way, the material migrating downwardly forms a bed of granules subsided although in downward progress and maintained in subsidence and in properly mixed condition by reason of the downflow therethrough of the solution. That is to say, the rates of relative downward progress of the material and of the solution are such that the solution passing at a controlled rate from the lower end portion of the tank will have been purified to a high degree, while the exchange material discharging at a controlled rate through the bottom outlet of the tank below the point of withdrawal of the treated solution, will have become correspondingly exhausted. The co-directional movements of the solution and of the mixed granular exchange material through the tank insure that the two exchange materials remain properly mixed even though migrating downwardly, with the solution efficiently contacting the mixed particles or granules because of the subsided condition in which they are maintained during that phase of the cyclic ion exchange operation. The exhausted mixed exchange materials discharging from the bottom end of the tank are transferred continuously to a separating station or tank there to be subjected to the separation hydraulically of the cation exchange granules from the anion exchange granules, namely by maintaining the granules in a teeter condition by an upflowing stream of liquid. In this way, the respective cation and anion exchange materials segregate from one another to form a bottom zone of the larger size or heavier granules of the one exchange material, and a top zone of the smaller size or lighter granules of the other exchange material, even while each of the two materials is being withdrawn continuously from its respective zone for transfer to a respective regeneration treatment station. The regenerated exchange materials derived from their respective regeneration treatment stations are then remixed and the mixture recirculated to the mixed exchange treatment station.

According to a more specific feature, the exchange materials are so weighted or sized with respect to one another as to render the granules of cation exchange material more readily settleable than the granules of anion exchange material, with the result in the teeter bed separation the cation exchange material will constitute the lower zone, and the anion exchange material will constitute the upper zone. Preliminary de-salting or de-ionization or ionic purification of the raw solution is effected in the cation-anion exchange sequence, with raw solution employed as the teeter liquid.

According to another specific feature, the size or weighting of the materials is such that the anion exchanger materials will form the lower zone, and the cation exchanger material will form the upper zone, so that said raw solution employed as teeter liquid may thus primarily be de-acidified by contact with the anion exchange materials of the lower zone.

In one embodiment the treatment system has both the separation station and the mixed exchange treatment station operating under atmospheric pressure conditions. Therefore, raw solution is pumped into the teeter separation station to pass therethrough upflow fashion for maintaining a teeter bed of exchange material, whence the solution thus pretreated overflows, the overflow transferring gravitationally to the mixed exchanger treatment tank.

A carrier water under pressure is supplied to operate ejectors in such a manner as to raise and transfer cation exchange material from the separation station to the top of a regeneration tower, with provision for excess material delivered to the tower to gravitationally re-transfer to the separation station. The regeneration towers for the respective exchange materials may be of the continuously operating type such as disclosed in the patent to Wilcox et al. No. 2,528,099.

As the invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by these claims.

In the accompany drawings,

Figure 1 is a diagrammatic view of the treatment system comprising the mixed exchange treatment tank equipped with mixing dome for raw solution and exchange materials as well as with automatic level control devices for maintaining desired levels of the exchange material and of the liquid in the tank, the teeter separating station for the exchange materials, and the regeneration towers for the respective exchange materials.

Figure 2 is a detail cross-section taken on line 2—2 through the mixing dome of the exchange treatment station.

Figure 3 is a detail cross-section taken on line 3—3 through the mixing dome somewhat below the section 2—2.

Figure 4:
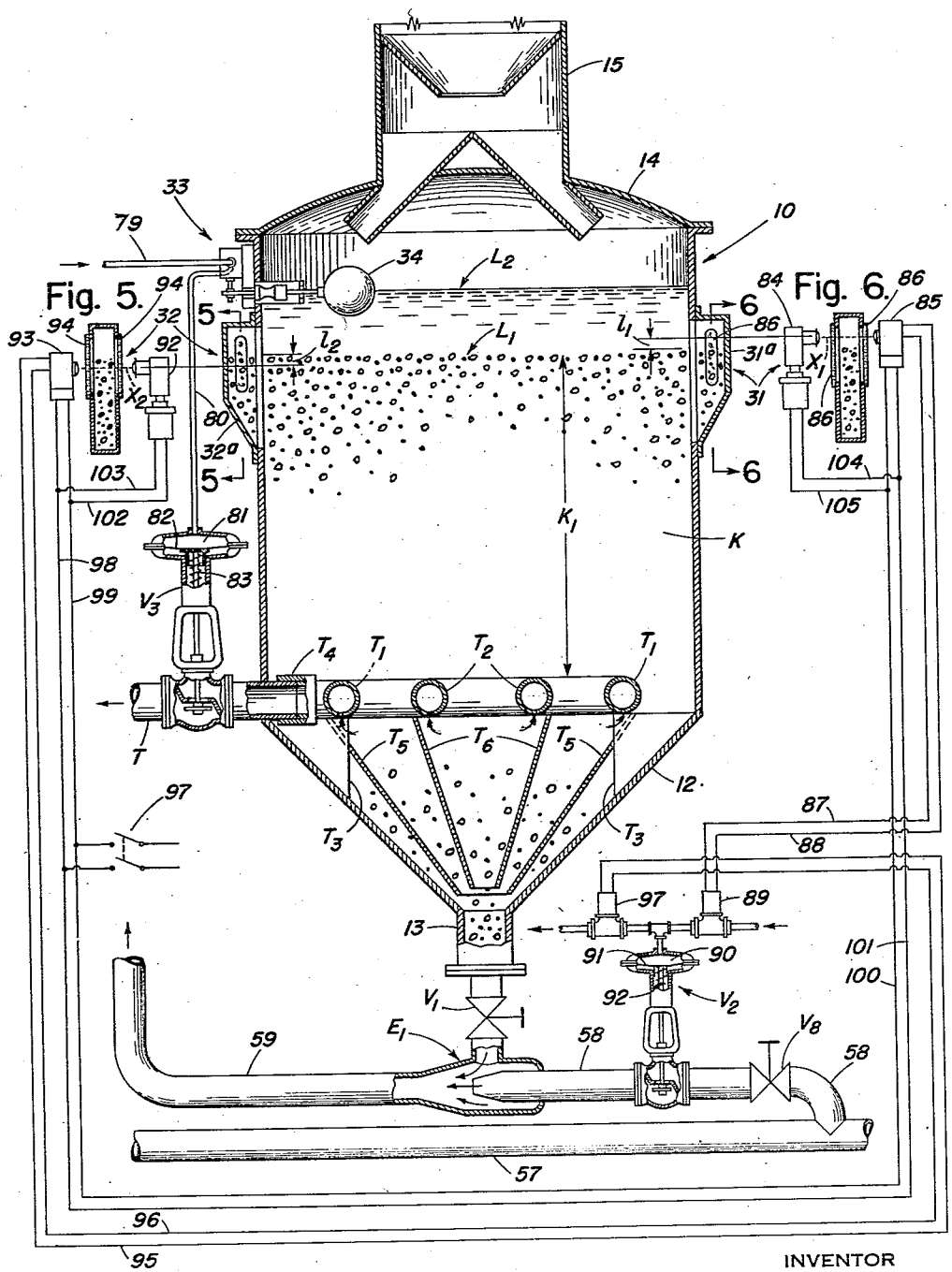
Figure 4 is an enlarged detail view of the exchange treatment tank, particularly implementing the level control devices.

Figures 5 and 6 are vertical sections taken on lines 5—5 and 6—6 respectively of the level control devices responsive to variations of the top level of the bed of mixed exchange material.

The apparatus arrangement or treatment system according to Figure 1 operates in continuous fashion, the manner of its operation here being illustrated by way of example in conjunction with the de-salting or de-ionization treatment of raw water whereby there is produced the equivalent of distilled water as a result of the mixed exchange treatment in this treatment system.

The example of Figure 1 presents the essence of the invention in the form of an apparatus system comprising treatment stations each being in effect a continuously operating apparatus unit within the system. These operating stations are:

A mixed exchange treatment station "A" for de-ionizing the raw water; a separating treatment station "B" for hydraulically upflow segregating the cation exchange material from the anion exchange material into respective zones one above the other, the exhausted mixture of such exchange materials having been received from the mixed exchange treatment station; a regeneration station "C" for the segregated cation exchange material; and a regeneration station "D" for the segregated anion exchange material.

The treatment system further comprises a supply of cation regenerant solution $S_1$ for the cation regeneration station "C" and a supply of anion regenerant solution $S_2$ for the anion regeneration station "D." The system also comprises a rinse water supply $R_1$ for the cation regeneration station and a rinse water supply $R_2$ for the anion regeneration station. The system further comprises a supply of hydraulic operating water "W" for the separating station, and a transfer conduit "F" carrying the spent hydraulic operating water to the mixed exchange treatment station; that is to say, according to this embodiment the raw water to be treated in the system is here employed as operating water in the segregation station "F" whereby this water is at once also being pretreated in that it becomes initially or slightly de-ionized incident to its upflow passage sequentially through the respective zones of suspended cation exchange material and of suspended anion exchange material. The system further comprises ejector-operated pipe conduits operatively connecting the various treatment stations with one another, to serve in the transfer of the liquid-carried exchange materials from one operating unit to another. Hence this pipe system comprises an ejector device $E_1$ for transferring the liquid-carried mixture or exhausted exchange materials from the bottom end of the mixed exchange station upwardly to the separating station, an ejector device $E_2$ for transferring the liquid-carried separated cation exchange material from the lower zone $Z_1$ of the separating station to the top end of the cation regeneration station, an ejector device $E_3$ for transferring the liquid carried separated anion exchange material from the upper zone $Z_2$ of the separation station to the top end of the anion exchange station; further an orifice—or constriction device $D_1$ for transferring liquid-carried regenerated cation exchange material from the bottom end of the cation exchange station to the top end of the mixed exchange treatment station, and an orifice—or constriction device $D_2$ for transferring liquid-carried regenerated anion exchange material from the bottom of the anion regeneration station to the top end of the mixed exchange treatment station. In the top end of the mixed exchange treatment station the spent operating water from the separation station mixes with the two ion exchange materials. In the mixed exchange treatment station the mixed exchange material accumulates in a bed or body "K" defined by top level $L_1$ submerged in a body of the liquid which in turn is defined by its level $L_2$. This system further has a discharge T for treated water from the mixed exchange treatment station, as well as a discharge $P_1$ for spent regenerant solution from the top end of the cation regeneration station, and a discharge $P_2$ for spent anion regenerant solution from the top end of the anion regeneration station.

There now follows a more detailed description of the individual treatment stations, as well as of the system as a whole, of its conduits, accessories, and control means for insuring proper operation.

The mixed exchange treatment station A is in the form of a tank 10 having a cylindrical body portion 11 and a bottom portion 12 which is of inverted conical shape provided with a downcast neck portion 13 for the discharge therefrom of the mixture of exhausted exchange materials through a manually settable valve $V_1$. This tank 10 has a top portion 14 comprising a mixing dome 15 having a central top inlet 16 for the water to be treated, as well as a pair of tangentially disposed inlets 17 and 18 (see also Figure 2) for introducing into the mixing dome the respective regenerated cation exchange and anion exchange materials to mix with the water to be treated. For the purpose of effectively mixing the water with the exchange materials the mixing dome is sub-divided by a baffle structure 19 of inverted trunco-conical shape into an upper mixing chamber 20 and a lower distributing chamber 21, the baffle 19 providing a vortex opening 22 through which the water-carried mixture of both exchange materials passes from the mixing chamber 20 into the distributing chamber 21. The distributing chamber 21 in turn is compartmented or sub-divided by means of a pair of vertical intersecting feed splitting baffles 23 and 24 dividing the cross sectional area of the chamber into four quarter sections 25, 26, 27, 28 each of which thus receives its proportionate share of the mixed exchange materials from the mixing chamber 20, and each of which has an outwardly and radially downwardly inclined delivery chute $27^a$, $28^a$, 29, 30 respectively, whereby there is attained a substantially uniform distribution of the exchange material over the effective cross-sectional area of the treatment tank and thus over the top face of the bed K, of mixed exchange materials contained therein. The mixture of exchange materials in this tank is indicated by larger particles or grains $G_1$ indicating the cation exchange material, and smaller particles or grains $G_2$ indicating the anion exchange material.

The treated liquid descends in contrast with the mixed exchange material through a depth $K_1$ of the bed K, to exit through a system of concentric annular collector tubes $T_1$ and $T_2$ supported as on ribs $T_3$. These tubes, for instance, may be of a porous material pervious to the liquid but impervious to the exchange materials. This system of annular tubes $T_1$ and $T_2$ is shown connected to the exit pipe T as by suitable coupling means $T_4$. The annular collecting tubes $T_1$ and $T_2$ are associated with downwardly constricted baffle members $T_5$ and $T_6$ respectively, which baffle members are thus also concentric although downwardly converging with respect to one another.

In order to maintain the bed K of mixed exchange material in this tank with a substantially constant top level $L_1$, there are provided automatic level control devices 31 and 32 described further below in conjunction with Figures 4, 5, 6. In order to maintain the level $L_2$ of the liquid body in the tank substantially constant, there is provided an automatic level control device 33 of the float-actuated type as indicated by the float ball 34 and disclosed in detail in the patent to R. C. Campbell No. 2,458,893.

The level control devices 31 and 32 are here shown by way of example to be of a photoelectric type (more fully detailed below and in Figure 5 of the drawings) for maintaining the level $L_1$ at a desired elevation in the tank. These level control devices operate by way of automatically actuating a control valve $V_2$ regulating the supply of carrier water under pressure to the discharge ejector $E_1$, in such a manner that any undue rise of level $L_1$ will increase the supply of carrier water to ejector $E_1$ thus increasing the rate of discharge of exhausted mixed exchange material from tank 10 until the level $L_1$ is restored to the desired elevation, whereas any undue drop of level $L_1$ will throttle or reduce the supply of carrier water to ejector $E_1$ and thus have the opposite effect to restore the level $L_1$ to the desired elevation in the tank.

The float-actuated level control device 33 will respond to any undue rise of liquid level $L_2$ by bringing about an opening of discharge valve $V_3$ to a degree and for a period of time sufficient to lower the liquid level $L_2$ to its desired elevation in the tank, whereas any undue drop of liquid level $L_2$ will cause the control device 33 to bring about the closing of the valve $V_3$ to a degree and for a period of time sufficient to lower the level $L_2$ to its desired elevation of the tank. At any rate, the coaction of the level control devices 31 with control devices 33 is such as to insure adequate submersion of the mixed exchange material in the liquid to be treated by maintaining liquid level $L_2$ in proper relation to the submerged bed level $L_1$.

The separating station B diagrammatically shown in Figure 1 comprises a tank 35 provided with a false bottom in the form of a constriction plate 36 defining between it and the tank bottom a distributing compartment 37 for the hydraulic operating water being furnished thereto from the raw water supply W. This raw water supplied under suitable pressure rises through the constriction plate 36 at such a rate as to maintain, in the tank, the zones of segregation $Z_1$ and $Z_2$ of the respective cation exchange material and anion exchange material in suspension. Above these two zones of separation there is maintained a third zone of clear water herein termed the freeboard zone $Z_3$. That is to say, the tank 35 is provided with an overflow launder 38 for discharging the spent operating water into the aforementioned transfer pipe conduit F for delivery into the mixing dome 15 of the mixed exchange treatment unit 10. The separating tank 35 is further provided with a vertical tubular feed-well 39 terminating downwardly at about a level corresponding to the interface I between the zones of separation $Z_1$ and $Z_2$ and it is further provided with a vertical tubular feedwell 40 terminating downwardly within the zone $Z_2$ of cation exchange material in suspension, and further provided with a vertical tubular feedwell 41 terminating downwardly within the zone $Z_1$ of anion exchange material in suspension. In this way, the feedwell 40 terminates a distance $d_1$ below the level of the interface I, whereas the feedwell 41 terminates a distance $d_2$ below the top face of the zone $Z_1$.

The regeneration stations C and D to handle the separated cation exchange material and anion exchange material respectively, are substantially identical, and their structure and function is known from the aforementioned patent to Wilcox No. 2,528,099. Briefly, the cation exchange station C comprises a vertical relatively slender tank or tower herein also termed the regeneration tower 42 having a bottom portion 43 of inverted conicity downwardly terminating in a discharge neck 44 provided with a manually settable valve $V_4$. An intermediate constriction plate 45 dividing the tower into an upper and a lower treatment section $N_1$ and $N_2$ is provided with one or more down-spouts 46 of the length "$h$" through which the material from the upper treatment section $N_1$ gravitationally migrates into the lower treatment section in accordance with the controlled rate at which the material is withdrawn from the bottom of the tank.

In this way, there are established in the regeneration tower 42 an upper operating zone $Z_4$ through which the cation exchange material gravitates while in a condition of subsidence undergoing regeneration, and a lower operating zone $Z_5$ through which the regenerated material gravitates in subsidence while being rinsed free of residual regenerant solution. The treatment zones $Z_4$ and $Z_5$ are therefore herein termed the regeneration zone and the rinsing zone respectively. However, it is characteristic of the function of this regeneration unit that it further comprises an intermediate zone $Z_6$ directly underlying the constriction plate 45. The depth of this intermediate zone $Z_6$ is relatively small as compared with the depth of the associated treatment zones $Z_4$ and $Z_5$, the depth is of the intermediate zone $Z_6$ being dependent upon the length "$h$" of the down-spouts 46, the length "$h$" to be sufficient to afford a seal against upflow diversion of spent rinse liquid through the down-spouts instead of it passing upwardly through the opening of the constriction plate proper. At any rate, the significance of the intermediate zone $Z_6$ lies in the fact that it is kept free from exchange material although liquid-filled so as to provide a space for mixing therein the spent rinse water rising from zone $Z_5$, with fresh regenerant solution to be introduced into this mixing zone $Z_6$. That is to say, the mixing zone $Z_6$ provides the space in which the fresh regenerant solution being of relatively high strength is effectively mixed with the spent rinse solution which contains residual regenerant chemical highly dilute, with the result that a desired intermediate concentration of regenerant solution is obtained in and by this mixing zone $Z_6$, the solution mixture to rise from the mixing zone through the constriction plate 45 into and through the superjacent body of cation exchange material thus being subjected to regeneration in zone $Z_4$.

Fresh regenerant of relatively high strength is introduced into the mixing zone $Z_6$ from the supply tank $S_1$ through a supply pipe 47 provided with a manually settable valve $V_5$ and leading to the lower end of the flow meter $M_1$ of the rota-meter type, and an exit pipe 48 leading from the upper end of the flow meter $M_1$ to the mixing zone $Z_6$.

Rinse water is introduced into the rinsing zone $Z_5$ through an annular distributing pipe 49 to which rinse water is in turn fed from supply $R_1$ through a pipe 50 having a manually settable valve $V_6$ and leading to the lower end of the flow meter $M_2$, and through an exit pipe 51 leading from the upper end of the flow meter to the annular distributing pipe 49.

The upper end of the cation regeneration tower 42 is closed by a top 52, and has an internal tray 53 of shallow inverted conicity provided with a central downcast boot 54, the top 52 and the tray 54 defining between them a receiving chamber 55 to which exhausted cation exchange material is supplied from zone $Z_1$ of the separation tank 35, which material gravitates through the boot 54 into the regeneration zone $Z_4$ at the controlled rate at which it is being discharged from the bottom end of tower 42. The tray 53 also defines beneath it a collecting zone $Z_7$ presenting an annular space surrounding the boot 54, free from exchange material, into which rises and which is filled by spent regenerant solution from the regeneration treatment zone $Z_4$ below, the spent solution to discharge from zone $Z_7$ through an overflow pipe 56.

The anion exchange regeneration station D is substantially identical to the cation exchange regeneration station C just described. This anion regeneration station D comprises a tower structure $42^a$ constructed and equipped substantially similar to the tower structure 42 of regeneration station C. The ejector device $E_3$ draws separated anion exchange material from the upper zone $Z_2$ of the separating tank 35 for transfer to the top end of the tower $42^a$ of anion regeneration station D; while regenerated anion exchange material discharges from the bottom end of the tower through a manually settable valve $V_8$.

Similar to cation regeneration tower 42 the anion regeneration tower $42^a$ comprises a receiving chamber $55^a$ defined by an internal tray $53^a$ having a downcast boot $54^a$, a constriction plate $45^a$ having down-spouts $46^a$, and an annular rinse water distributing head $49^a$. Spent regenerant solution discharges through overflow pipe $56^a$. Strong anion regenerant solution is passed to the towers from supply $S_2$ through a pipe $47^a$ provided with a manually settable valve $V_{15}$, to a flow meter $M_5$, and from therethrough an exit pipe $48^a$ to the tower $42^a$. Rinse water is supplied to the tower $42^a$ from supply $S_2$ through a pipe $50^a$ provided with a manually settable valve $V_{16}$, through a flow meter $M_6$, and through an exit pipe $51^a$ leading from the flow meter to the annular distributing head $49^a$.

In continuous operation the transfer of exchange material from one treatment station to another and its recirculation through the treatment system is effected by means of an ejector operated pipe conduit system as follows:

A main supply header 57 furnishes the operating water under pressure required for the operation of the ejector devices and as a carrier medium for the exchange material passing through the conduit system. The main supply header 57 has branch pipes leading to the various ejector devices whereby the exchange material discharging from any of the treatment stations is transferred to another. That is to say, a branch pipe 58 leads to the induction end of the ejector device $E_1$ which draws exhausted mixed exchange material from the bottom of treatment tank 10, this branch pipe 58 having a manually settable valve $V_8$ as well as the previously mentioned valve $V_2$ which is automatically controlled by the variations or fluctuations of the top level of the bed K of mixed exchange material in treatment tank 10. A transfer pipe 59 leads from the eduction end of ejector device $E_1$ up to the top of the separating tank 35, namely into the feedwell 39 thereof.

A branch pipe 60 provided with a manually settable valve $V_9$ leads up to the induction end of ejector device $E_2$ which through an induction pipe 61 draws separated cation exchange material from zone $Z_1$ of separating tank 35. A transfer pipe 62 leads from the eduction end of ejector device $E_2$ to the top end of the cation regeneration tower 42 for feeding exhausted cation exchange material into the receiving chamber 55 thereof. Any amount of such material excessively fed to this receiving chamber 55 overflows and automatically returns therefrom through return pipe 63 to feedwell 40 and thus to the lower zone $Z_1$ in separating tank 35.

A branch pipe 64, to carry operating water and provided with a manually settable valve $V_{10}$, leads from the main supply header 57 to the lower end of a flow meter $M_3$ from the top end of which an exit pipe 65 leads to a pipe junction 66 whence a transfer pipe 67 leads to the upper or mixing chamber 20 of mixing dome 15 of ion exchange treatment tank 10. Another branch pipe 68, to carry operating water provided with a manually settable valve $V_{11}$ leads to the induction end of the orifice device $D_1$, while an eduction pipe 69 leads from the eduction end of that device to and into pipe junction 66. With a suitable setting of the discharge valve $V_4$ at the bottom of cation regeneration tower 42, and with a suitable adjustment of the branch control valve $V_{11}$, the orifice device $D_1$ will allow to pass therethrough regenerated cation exchange material at a desired rate against the controllable back pressure of the operating water supplied to junction point 66 by pipe 65. That is to say, the rate of discharge of regenerated exchange material from cation exchange tower 42 is controllable by the relative setting of the discharge valve $V_4$, of the water supply valve $V_{11}$, and of the back pressure control valve $V_{10}$ that adjusts the back pressure of the operating water at junction point 66.

Similarly, the water supply connections for the anion regeneration station D comprises a branch pipe 70 having a manually settable valve $V_{12}$ leading to the induction end of ejector device $E_3$ which through an induction pipe 71 draws separated anion exchange material from the upper zone $Z_2$ in separating the tank 35. A transfer pipe 72 leads from the eduction end of the ejector device $E_3$ to the top end of the anion regeneration tower $42^a$.

A branch pipe 73, to carry operating water and having a manually settable valve $V_{13}$, leads to the lower or inlet end of a flow meter $M_4$, while an exit pipe 74 leads from the upper or outlet end of the flow meter $M_4$ to a pipe junction point 75 whence a transfer pipe 76 leads to the mixing chamber 20 of mixing dome 15 on the mixed exchange treatment tank 10. Another branch pipe 77, to carry operating water and having a manually settable valve $V_{14}$ leads to the induction end of the orifice device $D_2$, while an exit pipe 78 leads from the eduction end of the orifice device $D_2$ to the pipe junction point 75. With a suitable setting of the discharge valve $V'_7$ at the bottom of the anion regeneration tower $42^a$, and suitable adjustment of branch control valve $V_{14}$, and with proper setting of the back pressure control valve $V_{13}$, the orifice device $D_2$ will allow to pass therethrough regenerated anion exchange material at a desired rate against the controllable back pressure of the operating water supplied at junction point 75 by pipe 74. That is to say, the rate of discharge of regenerated ion exchange material from the anion exchange tower $42^a$ is controllable by the relative setting of the discharge valve $V'_7$ of the branch control valve $V_{14}$, and of the back pressure control valve $V_{13}$ which regulates the back pressure of the operating water supplied by pipe 74 at the pipe junction point 75.

With reference to the enlarged detail Figures 4, 5, 6 of the mixed exchange treatment station A, there will now be described in greater detail the functioning of the level control devices associated with this treatment station for maintaining the levels $L_1$ and $L_2$ therein of the exchange material and of the liquid respectively at their respective desired elevations.

The operation of the control device 33 responsive to variations of the liquid level $L_2$ has been fully disclosed and described in the aforementioned patent to R. C. Campbell No. 2,458,893. Accordingly, the control valve $V_2$ is in the nature of a diaphragm-controlled valve operated by auxiliary air pressure. That is to say, when the liquid level $L_2$ rises above a desired or normal elevation, it will by reason of the concurrent movement of float 34 admit compressed air from a pipe 79 into a pipe 80 leading to a diaphragm chamber 81 of valve $V_3$ to act upon a diaphragm 82 and against a compression spring 83 in a valve-opening sense, until the level $L_2$ and with it the float 34 will have dropped to the desired normal level. Conversely, when the liquid level $L_2$ falls below the desired or normal elevation, it will by reason of the concurrent movement of float 34 release pressure air from the diaphragm chamber 81 of valve $V_3$, thereby relieving air pressure acting upon diaphragm 82 and allowing the spring 83 to act in a valve-closing sense. In this way, the rate of discharge of treated water through valve $V_3$ will be compensatingly increased or decreased in a manner to maintain the level $L_2$ at a desired average elevation.

As for the control of the level $L_1$ of the bed K of exchange material for keeping the same constant there are provided the above mentioned pair of photo-electrically operated control devices 31 and 32, each of these devices being operatively associated with a respective laterally protruding hollow box portion $31^a$ and $32^a$ respectively extending from the wall of the treatment tank 10. The control device 31 comprises a light source 84 disposed at one side of box portion $31^a$ and a photo-electrical cell or target device 85 at the opposite side of box portion $31^a$ so that a horizontal light ray may traverse the interior of the box portion $31^a$ through windows 86 provided in the sidewalls thereof. The horizontal light axis $X_1$ of the photo-electrical control device 31 is disposed slightly above the normal level $L_1$ of the exchange material, which distance being here noted as $l_1$. That is to say, should level $L_2$ rise to or exceed the elevation of the light axis $X_1$ it will close a current through conductor 87 and 88 to actuate a solenoid-controlled valve 89 for admitting compressed air to the diaphragm chamber 90 of valve $V_2$, thus acting upon the diaphragm 91 and against a compression spring 92 in a valve-opening sense. In this way, due to the increased supply of operating water to the ejector device $E_1$, there will be effected an increased rate of discharge of treated exchange material through valve $V_1$ and into transfer pipe 59, until such time that the level $L_1$ will have attained its desired normal elevation.

The photo-electric control device 32 similarly comprises a light source 92 disposed at one side of the protruding box portion $32^a$ and a photo-electric cell or target device 93 at the opposite side of box portion $32^a$ so that the horizontal light ray as defined by the light axis $X_2$ may traverse through the interior of the box portion $32^a$ through a pair of windows 94 provided in the sidewalls thereof. The horizontal light axis $X_2$ is disposed a slight distance $l_2$ below the desired or normal level $L_1$, so that when the level $L_1$ drops to an elevation at or below that of the light axis $X_2$, the photo-electric target device 93 through the electric conduits 95 and 96 will act upon a solenoid-controlled valve 97 to release compressed air from the diaphragm chamber 90, so as to allow the compression spring 92 to act in a valve-closing sense. In this way, a supply of operating water to the ejector device $E_1$ is throttled and with it the rate of discharge of exhausted exchange material through discharge valve $V_1$, until such time that the level $L_2$ will again have attained its desired or normal elevation which is intermediate the elevations of the upper light axis $X_1$ and the lower light axis $X_2$. In this way, the admission of operating water through the diaphragm controlled valve $V_2$ is kept at an average rate such as to maintain the level $L_1$ intermediate the predetermined upper and lower limits as represented by the light axes $X_1$ and $X_2$ respectively.

An electric power source is indicated by a two-pole power switch 97 supplying relay current through conduits 98 and 99 to the target device 93 while conduits 100 and 101 supply relay current to the other target device 85. A pair of branch conduits 102 and 103 supply power to the light source 92, while a pair of branch conduits 104 and 105 supply power to the light source 84.

Differential pressure gauges $H_1$ and $H_2$ are shown associated with orifice devices $D_1$ and $D_2$ respectively.

In the operation of this apparatus system raw water is supplied at W into the bottom chamber 37 of the separating station or tank unit B, this water to rise through the constriction plate 36 to maintain a teeter bed of exchange material above and then to rise through a freeboard space above the teeter bed to the overflow launder 38. In this way, the mixture of exchange material supplied to this station is separated into the two zones of material in teeter condition, namely the lower zone $Z_1$ containing the cation exchange material and the upper zone $Z_2$ containing the anion exchange material, both materials being designated by grain sizes $G_1$ and $G_2$ respectively.

Since the exhausted mixed exchange material entering the separating station B still contains a residual exchange potential it will have a correspondingly initial de-ionization effect on the raw water that rise sequentially through the superposed zones $Z_1$ and $Z_2$ of the respective exchange materials maintaining them in a teeter condition. Therefore, the spent teeter water overflowing from the separating unit B will be somewhat de-ionized when passing from the overflow launder through transfer conduit $F_2$ to the mixed exchange unit A to undergo de-ionizing treatment.

The mixing dome 15 of tank 10 of the mixed exchange treatment unit receives simultaneously and continuously the spent teeter water from the separating station B, as well as regenerated cation exchange material through the tangential inlet 17 from regeneration station C, and regenerated anion exchange material through tangential inlet 18 from anion regeneration station C. The spent teeter water and the two exchange materials are thus thoroughly mixed in the mixing chamber 20 whence they gravitate through the opening 22 into the distributing chamber 19 and then in substantially equal portions into respective feed separating chambers 25, 26, 27, 28 for discharge through correspondingly distributing chutes $27^a$ and $28^a$, 29, 30 onto the submerged top face $L_1$ of the bed K of mixed exchange material in tank 10.

The mixed exchange material in the bed K being in subsided condition descends relatively slowly at the controlled rate at which it is drawn through the discharge neck 13 at the bottom and through the set valve $V_1$ by the ejector device $E_1$, the discharge rate being controlled by the amount of operating water admitted to ejector $E_1$ by valve $V_2$ which in turn is automatically controlled by the level control devices 31 and 32 to maintain the bed level $L_1$ of the material at a desired substantially constant elevation although submerged in the liquid. The liquid level control device 33 by automatically changing this setting of valve $V_3$ operates to maintain the liquid level $L_2$ substantially constant and thus in proper relationship to bed level $L_1$, namely, in a manner to insure submergence of bed level $L_1$.

The ejector device $E_1$ with the aid of the carrier water elevates the exhausted mixed exchange material through transfer pipe 59 to the top of the separating tank 35 and into the feedwell 39 thereof for discharge into the teeter bed at about the elevation of the interface I of the teeter zones $Z_1$ and $Z_2$ of the respective exchange materials. In this way, as the mixture enters the teeter bed, the respective exchange materials at once segregate into their respective zones $Z_1$ and $Z_2$.

Meanwhile, the separated although exhausted exchange material is also withdrawn continuously from each of the zones $Z_1$ and $Z_2$ of the teeter bed, for transfer to the respective regeneration stations C and D. That is to say, the ejector $E_2$ drawing cation exchange material from the lower teeter zone $Z_2$ with the aid of the carrier water elevates the material through transfer pipe 62 to the top of cation exchange tower 42 where it enters the receiving chamber 55, while any excess quantity of material from that chamber overflows through return pipe 63 to the feedwell 40 and thus back into the lower teeter zone $Z_1$ whence it came.

From the receiving chamber 55 the exchange material gravitates submerged and subsided through downcast boot 54 into the regeneration zone $Z_4$ where the material is supported partly by the constriction plate 45. From the regeneration zone $Z_4$ the material continues through the down-spouts 46 into the rinsing zone $Z_5$ through which it passes downwardly in subsided condition to discharge at a controlled rate in accordance with the operation of the constriction device $D_1$ for transfer through pipe 67 to the mixing dome 15 of the mixed exchange treatment tank 10. The rate at which the regenerated cation exchange material is thus supplied to the treatment station A is controlled and controllable by the relative settings of valves $V_4$, $V_{11}$, and of valve $V_{10}$ providing controllable hydraulic back pressure at the pipe junction point 66.

In this way, the cation exchange material migrates or descends at the thus controlled rate through the regeneration zone $Z_4$ countercurrently to the regenerant solution rising from the mixing zone $Z_6$ through the constriction plate 45, and then through the down-spouts 46. From the down-spouts 46 the material migrates through the rinsing zone $Z_5$ countercurrently to the wash water that rises from the annular distributing pipe or head 49. The spent rinse water reaches the mixing zone $Z_6$ underneath the construction plate, there to mix with the fresh strong regenerant solution from supply $S_1$ to produce regenerant solution of the desired concentration yet salvaging whatever regenerant chemical has been washed from the exchange material in the rinsing zone $Z_5$.

The operation of the anion regeneration station D is substantially the same as that just described of the cation regeneration station C, and therefore need here not be repeated.

What is claimed is:

1. A continuous de-ionization treatment apparatus for contacting a raw feed solution with granular cation and anion exchange materials in mixture although hydraulically separable from one another, in which the solution as well as the mixed exchange materials pass in contact with one another continuously through a mixed exchange treatment apparatus so that the mixed materials are adapted to become at least partially exhausted by concurrent cation and anion exchange with the solution as the treated liquid and the thus exhausted mixture of exchange materials discharge from the apparatus along different paths; the mixture of exchange materials is subjected to treatment in a separating station to separate the cation exchange material from the anion exchange material the separated materials are individually subjected to continuous regeneration in respective regeneration stations, and means are provided for re-introducing the regenerated re-mixed materials into the exchange treatment apparatus for continued treatment of said solution; characterized thereby that said exchange treatment apparatus comprises a mixed exchange treatment tank for holding a bed of the mixed exchange materials in subsidence, the tank being provided with means for continuously controllably feeding to the top thereof said solution as well as the regenerated mixed exchange materials, and also provided with means for continuously and controllably discharging the mixed exchange materials from the bottom of the tank, and furthermore provided with means for continuously and controllably discharging treated liquid from the lower portion of the tank although at a level above the discharge means for the exchange materials whereby the mixed exchange materials descend through the tank while constituting a bed of such material in subsidence and in submergence with the solution passing downwardly therethrough, a regeneration station for separately regenerating each of the exchange materials, a separation tank for hydraulically segregating said exhausted mixed exchange materials in teeter bed fashion into separate superposed teeter bed zones of cation exchange material at the bottom and anion exchange material at the top, controlled transfer means for passing mixed exchange material from the bottom of the exchange treatment tank to the separation tank, feed means for introducing raw feed solution into the teeter bed of the separating tank upflowing as teeter liquid to effect said zonewise separation of the respective exchange materials while passing from the top of the separation tank spent teeter liquid initially de-ionized by sequential contact with the respective ion exchange materials in said teeter zones, transfer means for passing cation exchange material from the one teeter zone at a controlled rate to the one respective regeneration station, other transfer means for passing anion exchange material from the other teeter zone at a controlled rate to the top of the other respective regeneration station, and transfer means for passing said spent teeter liquid initially de-ionized from the top of said separation tank to the top of said bed of mixed exchange materials in the exchange treatment tank.

2. A continuous process for continuously de-ionizing a raw feed solution with granular cation and anion exchange materials in mixture, where the solution as well as the mixed exchange materials pass in contact with one another through a mixed exchange treatment zone in such a manner that the mixed materials become at least partially exhausted by concurrent cation and anion exchange with the solution, and from which zone the treated liquid and the thus exhausted mixture of exchange materials are discharged along different paths, the mixture of exchange materials is subjected to separation of the cation exchange materials from the anion exchange material where further the separated exchange materials are individually subjected to regeneration, and in which further the regenerated materials are re-mixed and the mixture re-introduced into said exchange treatment zone; characterized by maintaining the mixed exchange materials in subsidence descending through said main treatment zone at a controlled rate co-directionally with said solution and submerged therein while discharging the solution from said zone at a level above the discharge of said material, continuously subjecting exhausted material to hydraulic separation in teeter bed fashion for establishing a zone of cation exchange and a zone of anion exchange material, continuously subjecting cation exchange material drawn from its teeter zone to continuous regeneration, and similarly subjecting anion exchange material drawn from its teeter zone to continuous regeneration, continuously supplying to the bed teeter liquid in the form of raw feed solution thereby subjecting said solution to initial de-ionization when rising through said zones of respective ion exchange materials, and feeding the spent teeter solution to said main treatment zone for further de-ionization.

References Cited in the file of this patent

UNITED STATES PATENTS

| | | |
|---|---|---|
| 2,365,221 | Shafer | Dec. 19, 1944 |
| 2,528,099 | Wilcox et al. | Oct. 31, 1950 |
| 2,563,006 | Collier | Aug. 7, 1951 |
| 2,666,741 | McMullen | Jan. 19, 1954 |

OTHER REFERENCES

Abstract of appn. 26,078, published in 663 O. G. 569, Oct. 14, 1952.